(12) United States Patent
Ito et al.

(10) Patent No.: US 7,483,106 B2
(45) Date of Patent: Jan. 27, 2009

(54) IN-PLANE SWITCHING LIQUID CRYSTAL DISPLAY DEVICE

(75) Inventors: Hideki Ito, Kawasaki (JP); Daisuke Inoue, Kawasaki (JP); Takashi Kamino, Izumi (JP); Hiromitsu Tanaka, Izumi (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 385 days.

(21) Appl. No.: 11/332,305

(22) Filed: Jan. 17, 2006

(65) Prior Publication Data

US 2006/0158597 A1 Jul. 20, 2006

(30) Foreign Application Priority Data

Jan. 17, 2005 (JP) ............................. 2005-009636

(51) Int. Cl.
*G02F 1/1343* (2006.01)
(52) U.S. Cl. ....................................... 349/141; 349/110
(58) Field of Classification Search ................. 349/141, 349/110
See application file for complete search history.

(56) References Cited

U.S. PATENT DOCUMENTS

2002/0149729 A1* 10/2002 Nishimura et al. .......... 349/141
2004/0212761 A1* 10/2004 Kadotani et al. ............ 349/110
2006/0055861 A1* 3/2006 Hirota ........................ 349/141
2006/0103789 A1* 5/2006 Takahashi et al. ........... 349/110

FOREIGN PATENT DOCUMENTS

JP 2002-258321 9/2002
JP 2002-323706 11/2002

\* cited by examiner

*Primary Examiner*—David Nelms
*Assistant Examiner*—Thanh-Nhan P Nguyen
(74) *Attorney, Agent, or Firm*—Young & Thompson

(57) ABSTRACT

A data wiring is provided on a glass substrate in an active element substrate. For the data wiring, a first portion, extending in a direction that slopes and forms a fixed angle with respect to the rubbing direction of an oriented film, and a second portion, extending in a direction sloping to the opposite side of the first portion are alternately arranged and formed in a zigzag pattern. A convex insulation film is formed in a zigzag pattern to cover the data wiring and a common electrode is formed in a zigzag pattern to cover the insulation film. A shilding layer is formed in a zigzag pattern on an opposing substrate to completely cover the insulation film and does not protrude from the region directly above the common electrode. The high-contrast, multi-domain system in-plane switching type liquid crystal display device obtained with a high numerical aperture and low black brightness.

12 Claims, 5 Drawing Sheets

IN-PLANE SWITCHING LIQUID CRYSTAL DISPLAY DEVICE

BACKGROUND OF THE INVENTION

1. Field of the Invention

The present invention relates to multi-domain system in-plane switching type liquid crystal display device.

2. Description of the Related Art

Conventionally, multi-domain systems have been developed for in-plane switching type liquid crystal display devices (for example, refer to Japanese Patent Laid-Open Publication No. 2002-323706, FIG. 15 and FIG. 47 as well as Japanese Patent Laid-Open Publication No. 2002-258321, FIG. 8). A multi-domain system is a system in which pixel electrodes and common electrodes, formed on an active element substrate, are formed in a zigzag shape to form one pair of sub-pixel regions (domain) on each unit pixel. In other words, a first portion, extending in a direction sloping towards the rubbing direction of an oriented film, and a second portion, extending in a direction sloping on the opposite side of the first portion towards that rubbing direction, are alternately arranged on each pixel electrode and each common electrode. Consequently, the directions of the electric fields applied to the liquid crystal molecules are different from each other in each unit pixel and because of this, two sub-pixel regions are formed wherein the rotation direction of the directors of the liquid crystal molecules are opposite to each other. As a result, because these two sub-pixel regions optically compensate each other, coloring that is seen when viewing a liquid crystal display device from an oblique direction as well as tone reversal that occurs between a black display and a half-tone display are controlled, making it possible to obtain even better viewing angle characteristics.

FIG. 1 is a partially enlarged plan view showing a conventional multi-domain system in-plane switching type liquid crystal display device. FIG. 2 is a cross-sectional view taken along the line C-C' shown in FIG. 1. FIG. 3 is a cross-sectional view taken along the line D-D' shown in FIG. 1. As shown in FIG. 1 to FIG. 3, an active element substrate 2 and an opposing substrate 103 are provided in this conventional liquid crystal display device 101 parallel to each other. A liquid crystal layer 4 is formed between the active element substrate 2 and the opposing substrate 103. This liquid crystal display device 101 is a normally black type liquid crystal display device.

A glass substrate 5 is provided on the active element substrate 2 and a gate insulation film 6 is provided on the upper surface of the side opposite the opposing substrate 103 on the glass substrate 5. A passivation film 7 is provided on the gate insulation film 6. In addition, a data wiring 8 is provided in one region on the passivation film 7. The data wiring 8 is formed in a zigzag pattern viewed from a direction perpendicular to the surface of the glass substrate 5 (hereinafter referred to as "viewed as a plan view"). In other words, a portion 8a, extending in a direction that slopes and forms a fixed angle with respect to a rubbing direction 31 (described later), and a portion 8b, extending in a direction that slopes to the side opposite to the direction in which the portion 8a extends with respect to the rubbing direction 31 and forms an angle with the same size, are alternately arranged.

A convex shaped insulation film 9 is provided on the passivation film 7 so as to cover the data wiring 8. The insulation film 9 is formed in a zigzag pattern in like manner to the data wiring 8 when viewed as a plan view. As shown in FIG. 2 and FIG. 3, the side of the convex shaped insulation film 9 is sloped. Furthermore, a common electrode 10, composed of a transparent conductive material, is provided so as to cover the upper surface and side surface of the insulation film 9. Because of this, the common electrode 10 can shield the data wiring 8. When viewed as a plan view, the common electrode 10 is formed in a zigzag pattern in like manner to the data wiring 8 and the insulation film 9 and the region where the common electrode 10 is formed is wider than the region where the insulation film 9 is formed. Consequently, the insulation film 9 is completely covered with the common electrode 10 and one part of the common electrode 10 is also formed in the region 32 except for the region directly above the insulation film 9. Even further, an oriented film 11 is provided over the passivation film 7 and the common electrode 10 on the entire surface of the glass substrate 5. The surface of the oriented film 11 is rubbed along the rubbing direction 31 shown in FIG. 1. The gate insulation film 6, the passivation film 7, and the oriented film 11 are not shown in FIG. 1.

In contrast, a glass substrate 21 is provided on the opposing substrate 103 and a shielding layer 26 is locally provided on the upper surface of the side opposite the active element substrate 2 on the glass substrate 21. When viewed as a plan view, the shape of the shielding layer 26 is a straight line. When viewed as a plan view, the shielding layer 26 is formed such that it does not protrude from the region directly above the common electrode 10 of the active element substrate 2 to prevent reductions in the numerical aperture of the pixels.

A colored layer 23 is provided on both sides of the shielding layer 26 on the glass substrate 21 and the edge of the colored layer 23 rests on the edge of the shielding layer 26. In addition, an overcoat layer 24 is formed so as to cover the shielding layer 26 and the colored layer 23. An oriented film 25 is also provided on the overcoat layer 24. The surface of the oriented film 25 is rubbed along a fixed direction.

The following problems existed in the conventional technology described above. As shown in FIG. 2 and FIG. 3, the shape of the insulation film 9 is a convex shape and protrudes from the periphery. Because of this, the sloping area of the insulation film 9 does not have sufficient rubbing in the rubbing process of the oriented film 11 while manufacturing a liquid crystal display device. In particular, it is easier for the rubbing of the falling sloping area to be less adequate than the rising sloping area. Consequently, it is much easier for the rubbing in the region 33 shown in FIG. 1 to be inadequate. Therefore, it is difficult to control the orientation of the liquid crystal material in the region 33.

When an electric field is not applied to the liquid crystal layer in a normally-black liquid crystal display device, the liquid crystal material is oriented by the action of the oriented film only to achieve a black display. Because of this, the orientation state of the liquid crystal material has a great influence on the transmittance in the liquid crystal layer 4 while displaying a black display and if the orientation is disturbed, the transmittance will increase. Thus, because the rubbing implemented on the oriented film 11 is poor in the region 33 and the action that orients the liquid crystal material is poor, the transmittance in the region 33 of the liquid crystal layer 4 inevitably becomes higher.

As shown in FIG. 1, the shielding layer 26 is formed in a straight line such that it does not protrude from the region directly above the common electrode 10 in order to prevent reductions in the numerical aperture of the liquid crystal display device. In contrast, when viewed as a plan view, the shape of the convex-shaped insulation film 9 is a zigzag shape. Because of this, an area where the shielding layer 26 is not provided develops in the region directly above the insulation film 9. The region 33 is also included in this type of area. Therefore, light transmitted through the liquid crystal layer 4 in the region 33 while displaying a black display is not blocked by the shielding layer 26 and ends up leaking outside the liquid crystal display device. In addition, the brightness while displaying a black display, or namely the black brightness, becomes higher as well. In contrast, if the width of the shielding layer 26 is made wider, the light leakage can be reduced although the numerical aperture will be reduced. If the black brightness is increased or if the numerical aperture is reduced, the contrast of the image display will be reduced.

Moreover, if the rubbing strength is unreasonably increased in order to improve the orientation force of the oriented film 11, the oriented film 11 will not be able to bear the rubbing and detach. The resulting image quality will be reduced due to that detached mark and detached refuse.

SUMMARY OF THE INVENTION

An object of the present invention is to provide a high-contrast in-plane switching type liquid crystal display device with a high numerical aperture and low black brightness in a multi-domain system in-plane liquid crystal display device.

An in-plane switching type liquid crystal display device according to the present invention includes: an active element substrate; an opposing substrate arranged on the active element substrate; and a liquid crystal layer arranged between the active element substrate and the opposing substrate. The active element substrate includes: a substrate; a wiring that is arranged on the substrate and has a part extending in a first direction parallel to the surface of the substrate and another part extending in a second direction parallel to the surface of the substrate and different from the first direction; a convex-shaped insulation film that is arranged so as to cover this wiring and has a part extending in the first direction and another part extending in the second direction; an electrode that is arranged on this insulation film and has a part extending in the first direction and another part extending in the second direction; and an oriented film arranged on this electrode, for allowing the liquid crystal layer to be oriented. The opposing substrate has a shielding layer that is formed in a region including the entire region directly over the insulation film and in a region positioned inside the region directly over the electrode.

Because the shielding layer is formed in a region that includes the entire region directly over the insulation film in the present invention, even though the rubbing of the oriented film directly over the insulation film on the liquid crystal layer is insufficient and the liquid crystal layer transmits light while displaying a black display, this light can be blocked by the shielding layer. In addition, the numerical aperture is also high because the shielding layer is formed in a region positioned inside the region directly over the electrode.

According to the present invention, forming the shielding layer in a region that includes the entire region directly over the insulation film as well as in a region positioned inside the region directly over the electrode makes it possible to obtain a high-contrast in-plane liquid crystal display device with a high numerical aperture and low black brightness.

DETAILED DESCRIPTION OF THE PREFERRED EMBODIMENT

Figure 4:
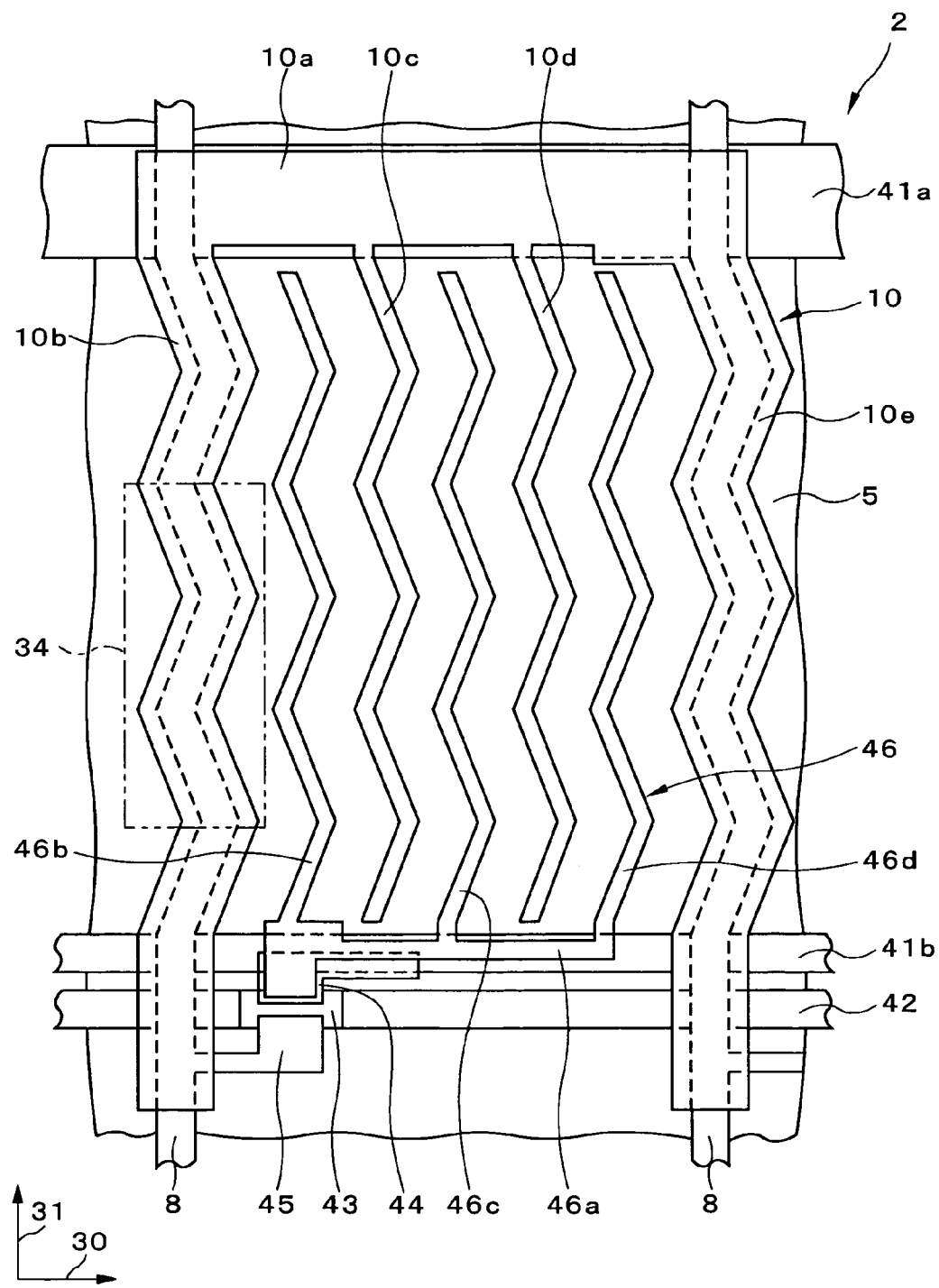
FIG. 4 is a plan view showing the liquid crystal display device according to one embodiment of the present invention.
Figure 5:
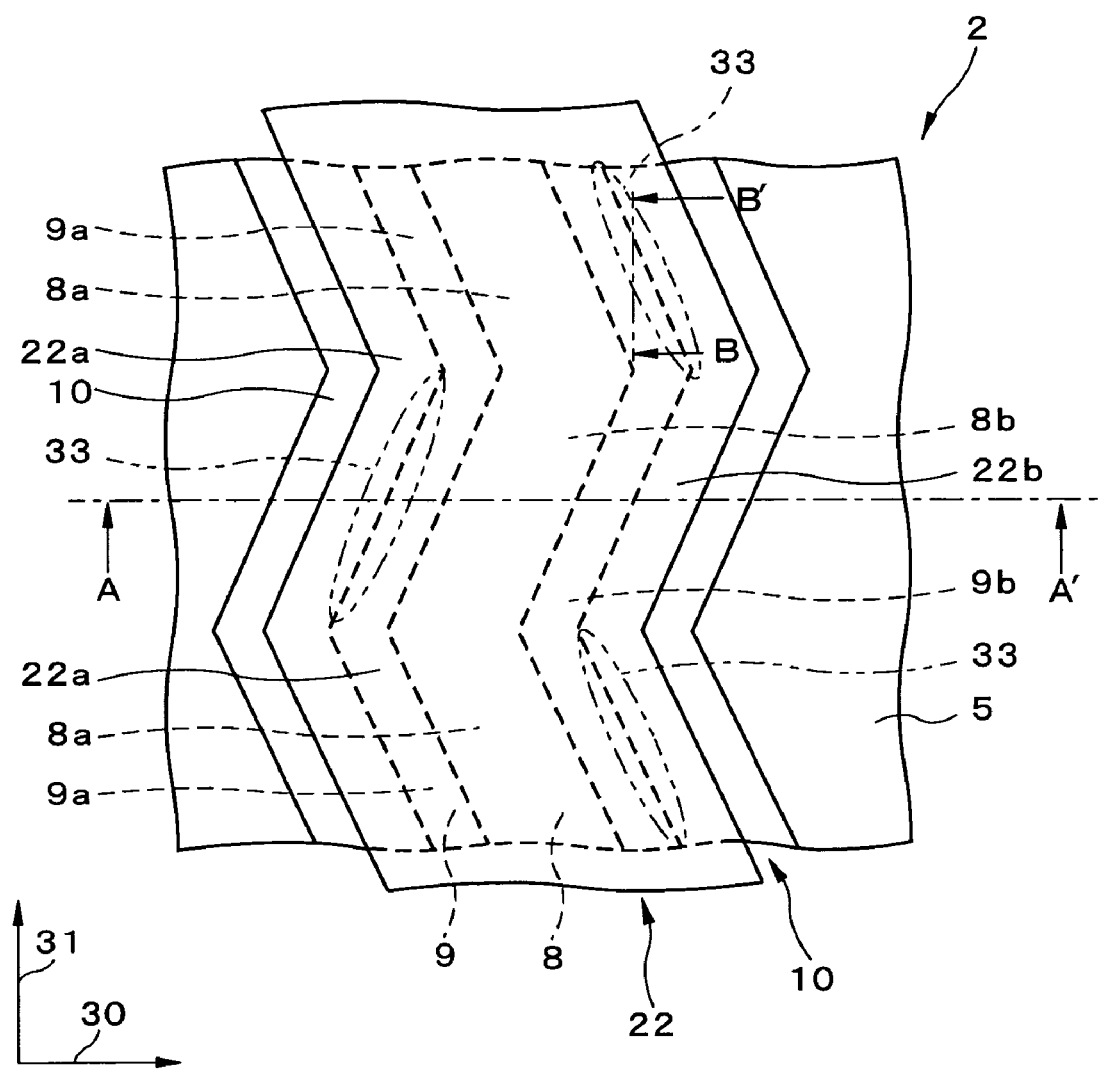
FIG. 5 is a partially enlarged plan view showing a region 34 shown in FIG. 4.
Figure 6:
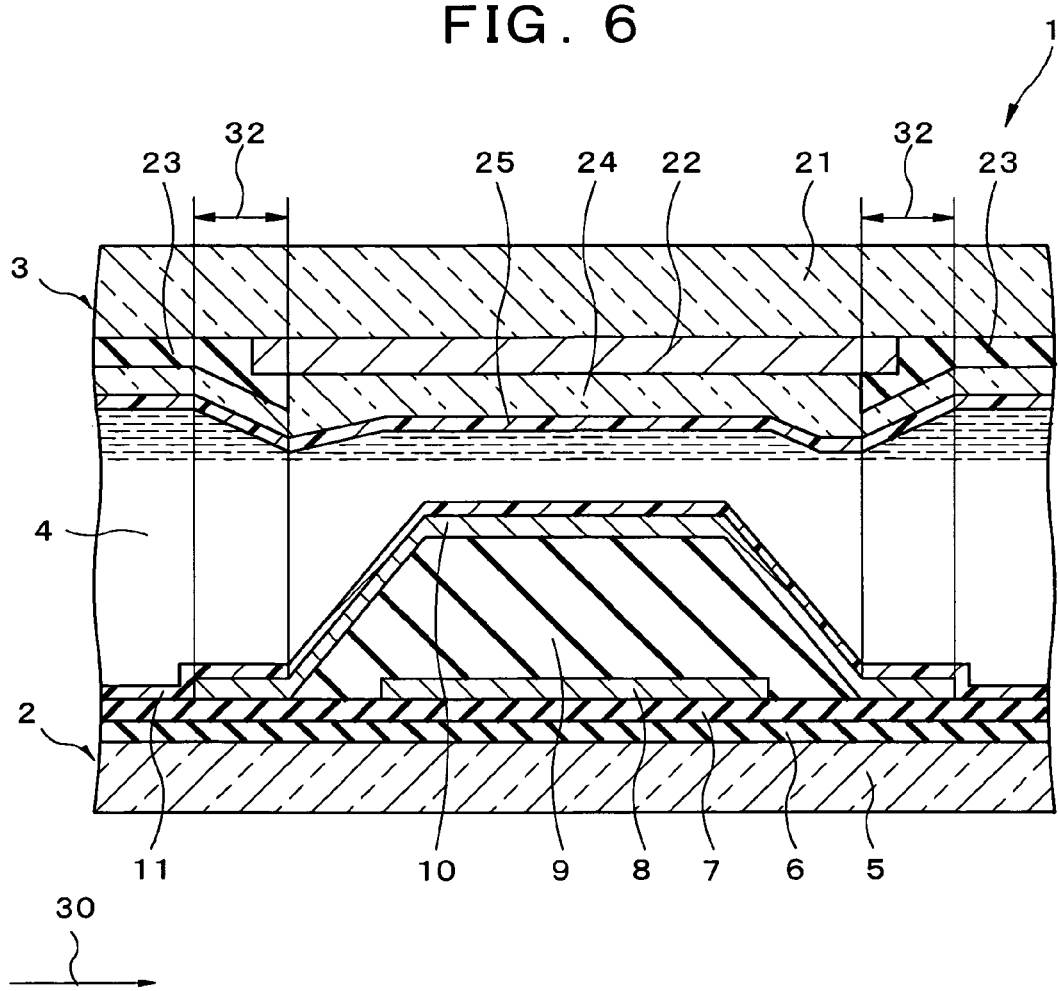
FIG. 6 is a cross-sectional view taken along the line A-A' shown in FIG. 5.
Figure 7:
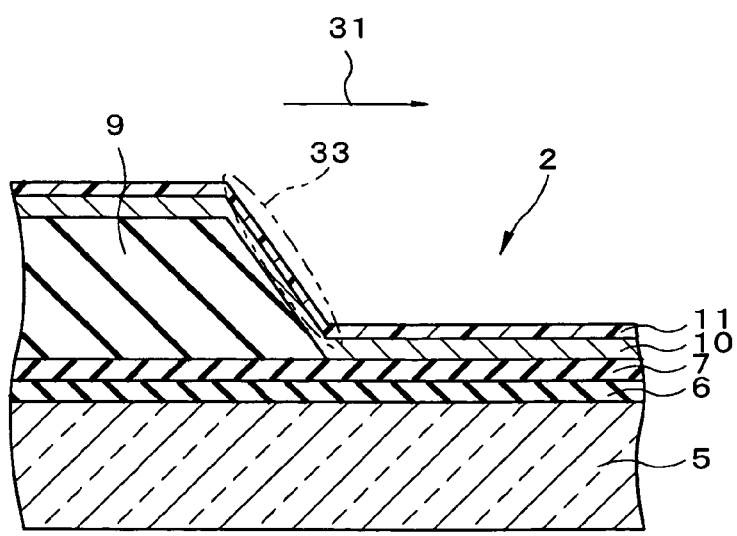
FIG. 7 is a cross-sectional view taken along the line B-B' shown in FIG. 5.

In the following, a detailed description of the embodiment of the present invention will be described referring to the drawings. FIG. 4 is a plan view showing the liquid crystal display device according to the embodiment of the present invention. FIG. 5 is a partially enlarged plan view showing a region 34 shown in FIG. 4. FIG. 6 is a cross-sectional view taken along the line A-A' shown in FIG. 5 and FIG. 7 is a cross-sectional view taken along the line B-B' shown in FIG. 5. FIG. 4 and FIG. 5 only show the active element substrate and do not show the opposing substrate. FIG. 5 does show the shielding layer. The liquid crystal display device shown in FIG. 4 to FIG. 7 is a multi-domain system in-plane switching type liquid crystal display device and is a normally black type liquid crystal display device. In the liquid crystal display device according to the embodiment, an active element substrate 2 and an opposing substrate 3 are provided parallel to each other and a liquid crystal layer 4 is formed between the active element substrate 2 and the opposing substrate 3.

A glass substrate 5 is provided on the active element substrate 2 and a pair of common electrode wirings 41a and 41b are provided on the surface of the side opposite the opposing substrate 3 on the glass substrate 5 so as to hold unit pixels. Also, a gate electrode wiring 42 is provided at a position that holds the common electrode wiring 41b between the common electrode wiring 41a. The common electrode wirings 41a and 41b and the gate electrode wiring 42 extend in a straight line parallel to each other along the direction 30. A gate insulation film 6 is provided on the glass substrate 5 such that it covers the common electrode wirings 41a and 41b and the gate electrode wiring 42. A passivation film 7 is provided on the gate insulation film 6.

In addition, a data wiring 8 is provided in one region on the passivation film 7. The data wiring 8 is formed in a zigzag pattern viewed from a direction parallel to the surface of the glass substrate 5 or namely, when viewed as a plan view. In other words, a portion 8a, extending in a direction that slopes and forms a fixed angle with respect to the direction 31 that is parallel to the surface of the glass substrate 5 as well as perpendicular to the direction 30, and a portion 8b, extending in a direction that slopes to the side opposite to the direction in which the portion 8a extends with respect to the direction 31 and forms an angle with the same size, are alternately arranged.

Furthermore, a thin film transistor (TFT) 43 is provided in one part of the region directly over the gate electrode wiring 42 on the gate insulation film 6 and a source electrode 44, connected to the source region of this transistor, is provided in the region directly over the source region of the thin film transistor 43. A drain electrode 45, connected to the drain region of this transistor, is provided in the region directly over the drain region. The drain electrode 45 is connected to the data wiring 8. The convex-shaped insulation film 9 is provided on the passivation film 7 so as to cover this data wiring 8. The insulation film 9 is formed in a zigzag pattern in like manner to the data wiring 8 when viewed as a plan view. In other words, a portion 9a, extending in a direction that slopes and forms a fixed angle with respect to the direction 31, and a portion 9b, extending in a direction that slopes to the side opposite to the direction in which the portion 9a extends with respect to the direction 31 and forms an angle with the same size, are alternately arranged and formed. As shown in FIG. 6 and FIG. 7, the side of the convex-shaped insulation film 9 is sloped.

A common electrode 10, composed of a transparent conductive material, is provided so as to cover the upper surface and side surface of the insulation film 9. Because of this, the common electrode 10 can shield the data wiring 8. When viewed as a plan view, the common electrode 10 is formed in a comb-like pattern and is composed of a base section 10a and four tooth sections 10b to 10e. The base section 10a is arranged in the region directly over the common electrode wiring 41a and extends along the direction 30. The four tooth sections 10b to 10e are arranged in order parallel to each other and the tooth sections 10b and 10e arranged on the outside are thicker than the tooth sections 10c and 10d arranged on the inside. The tooth sections 10b and 10e are also arranged in the region directly over the data wiring 8 and the insulation film 9.

The tooth sections 10b to 10e of the common electrode 10 are formed in a zigzag pattern in like manner to the data wiring 8 and the insulation film 9. A portion, extending in a direction that slopes and forms a fixed angle with respect to the direction 31, and another portion, extending in a direction that slopes to the side opposite to the direction in which the former portion extends with respect to the direction 31 and forms an angle with the same size, are alternately arranged and formed. The region where the tooth sections 10b and 10e are formed is wider than the region where the insulation film 9 is formed. Consequently, the insulation film 9 is completely covered with the tooth sections 10b and 10e. One part of the tooth sections 10b and 10e is also formed in the region 32 except for the region directly above the insulation film 9. The common electrode 10 is connected to the common electrode wirings 41a and 41b through a via (not shown in the figure). The common electrode 10 is also insulated against the data wiring 8 by the insulation film 9.

Even further, a pixel electrode 46 is provided on the passivation film 7. When viewed as a plan view, the pixel electrode 46 is formed in a comb-like pattern and is composed of a base section 46a and three tooth sections 46b to 46d. The base section 46a is arranged in the region directly over the common electrode wiring 41a extending along the direction 30. The three tooth sections 46b to 46d are arranged in order parallel to each other and have the same common thickness. The tooth sections 46b to 46d of the pixel electrode 46 are alternately arranged between the tooth sections 10b to 10e of the common electrode 10 and are also arranged in a zigzag pattern parallel to the tooth sections 10b to 10e. The base section 46a of the pixel electrode 46 is connected to the source electrode 44. Because of this, the pixel electrode 46 is connected to the data wiring 8 through the thin film transistor 43.

In addition, the oriented film 11, formed of an organic material, is provided above the passivation film 7, the common electrode 10, and the pixel electrode 46 over the entire surface of the glass substrate 5. The surface of the oriented film 11 is rubbed along the rubbing direction 31 shown in FIG. 4. The gate insulation film 6, the passivation film 7, and the oriented film 11 are not shown in FIG. 4.

In contrast, a glass substrate 21 is provided on the opposing substrate 3 and a shielding layer 22 is locally provided on the upper surface of the side opposite the active element substrate 2 on the glass substrate 21. When viewed as a plan view, the shape of the shielding layer 22 is a zigzag pattern in like manner to the data wiring 8 and the insulation film 9. Further, a portion 22a, extending in a direction that slopes and forms a fixed angle with respect to the rubbing direction 31 of the oriented film 11, and a portion 22b, extending in a direction that slopes to the side opposite to the direction in which the portion 22a extends with respect to the direction 31 and forms an angle with the same size, are alternately arranged and formed. The width of the shielding layer 22 is smaller than the width of the common electrode 10 and the ends in the widthwise direction are arranged so as to be positioned inside the region 32 at a position opposite the data wiring 8. Because of this, the shielding layer 22 completely covers the convex-shaped insulation film 9 such that it does not protrude from the common electrode 10. In other words, the shielding layer 22 is formed in a region that includes the entire region directly over the insulation film 9 as well as the region positioned inside the region directly over the common electrode 10. Although the shielding layer 22 is formed of a black matrix comprising Cr, for example, the shielding layer 22 can be formed of a black matrix composed of a resin and can also be formed by overlapping colored layers.

The colored layer 23 is provided on both sides of the shielding layer 22 on the glass substrate 21 and the edge of the colored layer 23 rests on the edge of the shielding layer 22. In addition, an overcoat layer 24 is formed so as to cover the shielding layer 22 and the colored layer 23 and the oriented film 25, composed of an organic material, is also provided on the overcoat layer 24. The surface of the oriented film 25 is also rubbed along a fixed direction. Consequently, the liquid crystal material that constitutes the liquid crystal layer 4 can be oriented in a uniform direction.

Figure 1:
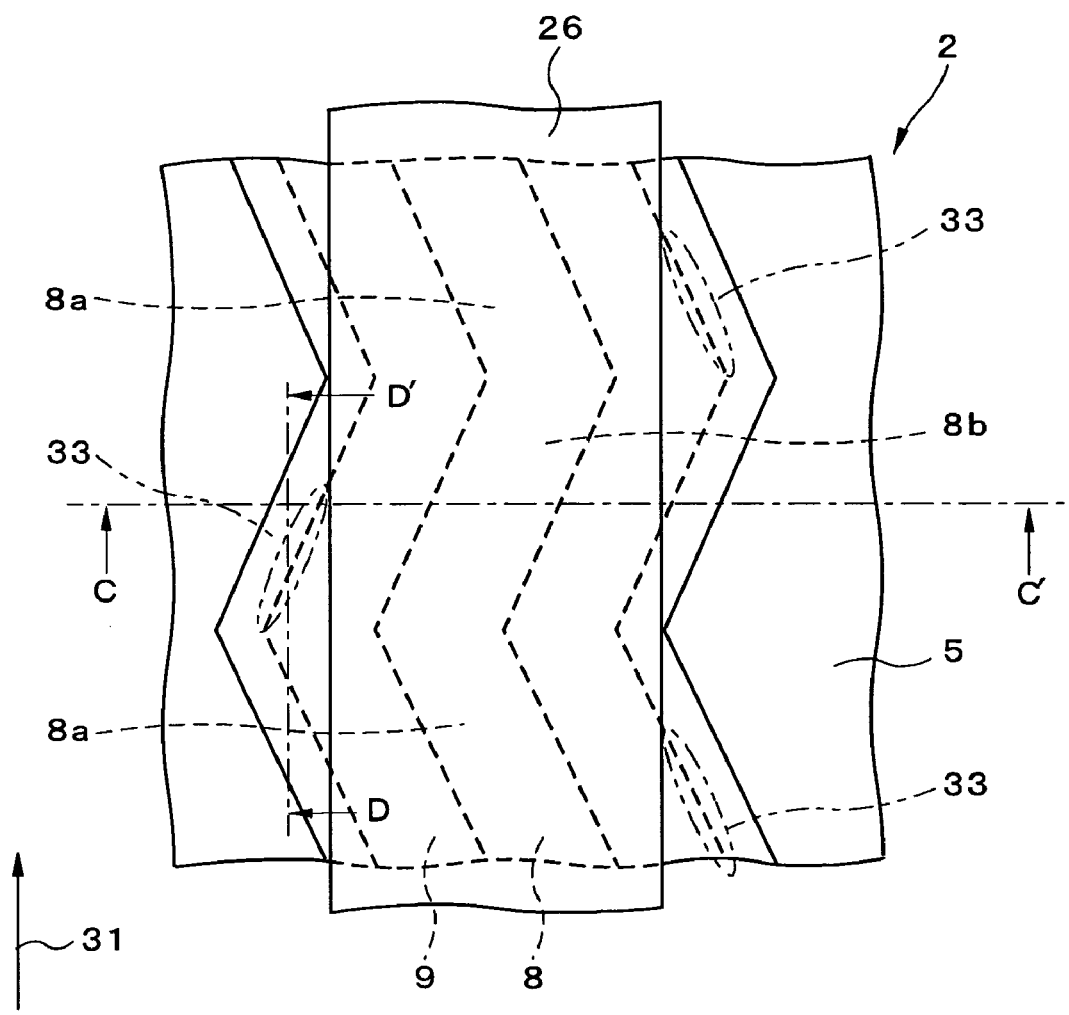
FIG. 1 is a partially enlarged plan view showing a conventional multi-domain system in-plane switching type liquid crystal display device.
Figure 2:
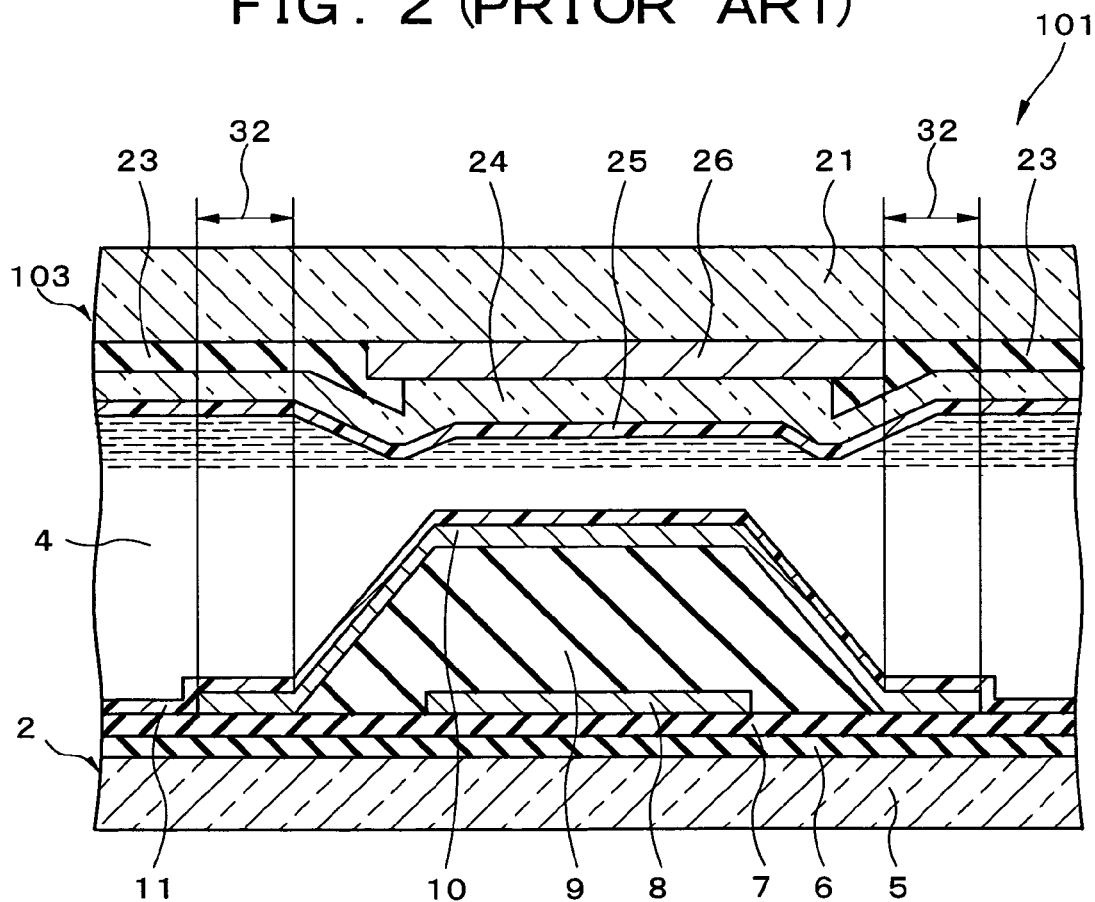
FIG. 2 is a cross-sectional view taken along the line C-C' shown in FIG. 1.
Figure 3:
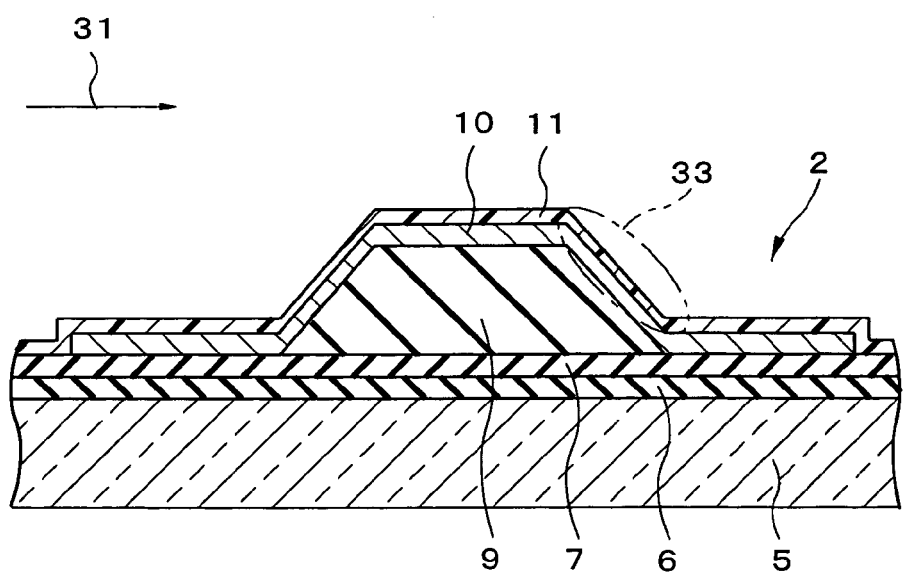
FIG. 3 is a cross-sectional view taken along the line D-D' shown in FIG. 1.

Next, the operation of the embodiment will be described. Because the convex-shaped insulation film 9 is formed on the active element substrate 2 in the liquid crystal display device 1 according to this embodiment in like manner to the conventional liquid crystal display device 101 described above (refer to FIG. 1), the sloping portion of the insulation film 9 is not sufficiently rubbed in the rubbing process when manufacturing a panel. In particular, when the rubbing direction is the direction 31 shown in FIG. 1, the falling sloping area is insufficiently rubbed compared to the rising sloping area seen from this direction. Therefore, the rubbing is particularly insufficient in the region 33 that corresponds to the falling sloping area of the insulation film 9. Because of this, the orientation of the liquid crystal material is insufficient in the region 33 while displaying a black display and the light transmittance of the liquid crystal layer 4 becomes higher than the region outside the region 33.

In this embodiment however, since the shielding layer 22 is formed so as to completely cover the insulation film 9, the shielding layer 22 surely exists in the region directly over the insulation film 9 and therefore the shielding layer 22 exists in the region 33. Consequently, light that passes through the liquid crystal layer 4 in the region 33 is blocked by the shielding layer 22. Thus, since the shielding layer 22 surely exists in the region 33 in this manner in the liquid crystal display device 1 according to this embodiment, there is no light leakage in the region 33, making it possible to control the brightness while displaying a black display to a low level. In contrast, since the shielding layer 22 is formed such that it does not protrude from the region directly over the common electrode 10, the liquid crystal display device 1 does not have any reductions in the numerical aperture compared to the conventional liquid crystal display device 101 described above (refer to FIG. 1) in which the shielding layer is formed in a straight line. Because of this, the liquid crystal display device 1 according to this embodiment improves the contrast since the black brightness is low along with an equal numerical aperture compared to the conventional liquid crystal display device 101. Even further, this embodiment can achieve a high-contrast liquid crystal display device without changing the materials, members, and processes which form a conventional liquid crystal display device.

In addition, since the liquid crystal display device 1 according to this embodiment is a multi-domain system liquid crystal display device in which the common electrode 10 and the pixel electrode 46 are formed in a zigzag pattern, coloring that is seen when viewing a liquid crystal display device from an oblique direction as well as tone reversal that occurs between a black display and a half-tone display are controlled, making it possible to obtain even better viewing angle characteristics.

As described above, the present invention can be utilized in a multi-domain system in-plane switching type liquid crystal display device and in particular can be favorably utilized in normally black type liquid crystal display device.

What is claimed is:

1. An in-plane switching type liquid crystal display device comprising:
   an active element substrate;
   an opposing substrate arranged on the active element substrate; and
   a liquid crystal layer arranged between the active element substrate and the opposing substrate,
   wherein
   said active element substrate has:
      a substrate;
      a wiring that is arranged on the substrate and has a part extending in a first direction parallel to the surface of the substrate and another part extending in a second direction parallel to the surface of the substrate and different from the first direction;
      a convex-shaped insulation film that is arranged so as to cover the wiring and has a part extending in the first direction and another part extending in the second direction;
      an electrode that is arranged on the insulation film and has a part extending in the first direction and another part extending in the second direction; and
      an oriented film arranged on the electrode, for allowing the liquid crystal layer to be oriented, and
   said opposing substrate has a shielding layer that is formed in a region including the entire region directly over the insulation film and in a region positioned inside the region directly over the electrode.

2. The in-plane switching type liquid crystal display device according to claim 1, wherein
   the shielding layer has a part extending in the first direction and another part extending in the second direction.

3. The in-plane switching type liquid crystal display device according to claim 2, wherein
   in the shielding layer the part extending in the first direction and the part extending in the second direction are alternately arranged.

4. The in-plane switching type liquid crystal display device according to claim 1, wherein:
   the first direction is a direction that slopes and forms a fixed angle with respect to a rubbing direction of the oriented film; and
   the second direction is a direction that slopes to a side opposite to the first direction with respect to the rubbing direction and forms an angle with the same size as the fixed angle.

5. The in-plane switching type liquid crystal display device according to claim 2, wherein:
   the first direction is a direction that slopes and forms a fixed angle with respect to a rubbing direction of the oriented film; and
   the second direction is a direction that slopes to a side opposite to the first direction with respect to the rubbing direction and forms an angle with the same size as the fixed angle.

6. The in-plane switching type liquid crystal display device according to claim 3, wherein:
   the first direction is a direction that slopes and forms a fixed angle with respect to a rubbing direction of the oriented film; and
   the second direction is a direction that slopes to a side opposite to the first direction with respect to the rubbing direction and forms an angle with the same size as the fixed angle.

7. The in-plane switching type liquid crystal display device according to claim 1, being a normally black type.

8. The in-plane switching type liquid crystal display device according to claim 2, being a normally black type.

9. The in-plane switching type liquid crystal display device according to claim 3, being a normally black type.

10. The in-plane switching type liquid crystal display device according to claim 4, being a normally black type.

11. The in-plane switching type liquid crystal display device according to claim 5, being a normally black type.

12. The in-plane switching type liquid crystal display device according to claim 6, being a normally black type.

* * * * *